March 18, 1941.　　　C. D. HAVEN ET AL　　　2,235,681

MULTIPLY GLASS SHEET GLAZING UNIT

Filed Aug. 8, 1938　　　8 Sheets-Sheet 1

Inventors
CHARLES D. HAVEN.
JOHN J. HOPFIELD.
By Frank Fraser
Attorney

March 18, 1941.  C. D. HAVEN ET AL  2,235,681
MULTIPLY GLASS SHEET GLAZING UNIT
Filed Aug. 8, 1938  8 Sheets-Sheet 2

Inventors
CHARLES D. HAVEN.
JOHN J. HOPFIELD.
By Frank Fraser
Attorney

March 18, 1941. C. D. HAVEN ET AL 2,235,681

MULTIPLY GLASS SHEET GLAZING UNIT

Filed Aug. 8, 1938 8 Sheets-Sheet 3

Inventors
CHARLES D. HAVEN.
JOHN J. HOPFIELD.
By Frank Fraser,
Attorney

March 18, 1941.  C. D. HAVEN ET AL  2,235,681
MULTIPLY GLASS SHEET GLAZING UNIT
Filed Aug. 8, 1938  8 Sheets-Sheet 5

Inventors
CHARLES D. HAVEN.
JOHN J. HOPFIELD.
Frank Fraser
Attorney

Inventors
CHARLES D. HAVEN.
JOHN J. HOPFIELD.

By Frank Fraser
Attorney

March 18, 1941.  C. D. HAVEN ET AL  2,235,681
MULTIPLY GLASS SHEET GLAZING UNIT
Filed Aug. 8, 1938   8 Sheets-Sheet 7

Inventors
CHARLES D. HAVEN.
JOHN J. HOPFIELD.
By Frank Fraser
Attorney

March 18, 1941.　　C. D. HAVEN ET AL　　2,235,681
MULTIPLY GLASS SHEET GLAZING UNIT
Filed Aug. 8, 1938　　8 Sheets-Sheet 8

Inventors
CHARLES D. HAVEN.
JOHN J. HOPFIELD.
By Frank Fraser
Attorney

Patented Mar. 18, 1941

2,235,681

UNITED STATES PATENT OFFICE 2,235,681

MULTIPLY GLASS SHEET GLAZING UNIT

Charles D. Haven and John J. Hopfield, Toledo, Ohio, assignors to Libbey-Owens-Ford Glass Company, Toledo, Ohio, a corporation of Ohio Application August 8, 1938, Serial No. 223,635

17 Claims. (Cl. 20—56.5)

The present invention relates to a multiply glass sheet glazing unit and to the method and apparatus for producing the same. More specifically, the invention relates to a single unit, multiple glass sheet glazing construction comprising two or more sheets of glass spaced apart by metallic separating means which are bonded directly or through the intermediary of a metallic coating or coatings to the glass sheets entirely around their perimeter edges or marginal portions.

Primarily, we are concerned with what may be termed an all glass and metal glazing unit in which glass sheets are held in spaced relation by the metal in a manner to create an air and moisture-tight space or spaces between the glass sheets to give a permanent and satisfactory structure for reducing heat transfer and to reduce, if not prevent, condensation of moisture upon glass in glazed openings. Ordinarily, such glazing units are used in a way that one sheet of glass is subjected to different temperature and other atmospheric conditions than that to which the other sheet or sheets may be exposed. For example, in a building in the winter time the outside sheet of glass is subjected to rather low temperatures while the inner sheet of glass is exposed to relatively much higher temperatures. Because of such or other analogous temperature differentials between parts of the same glazing unit, one sheet of glass tends to expand or contract to a greater or lesser extent than the other sheet as the case may be, with the result that there is a decided strain or stress upon the bond or union between the glass sheets and separator means employed to hold the glass sheets in spaced relation. This differential and varying expansion and contraction of the component parts of the construction, coupled with other varying conditions to which the units are normally subjected when in use, make it extremely difficult to construct a glazing unit of this character in which the elements will remain joined together permanently in a way to prevent excessive leakage of air, moisture, or other foreign substance into the space between the glass sheets.

Work which we have done with organic separating and cementing materials has convinced us that use of such materials is objectionable because, although apparently excellent bond can be obtained between the glass and organic materials, experience has shown that the units are not entirely or always dependable when in service for any one of a number of reasons; namely, break-down of the bond between the glass and organic separating and bond-inducing materials, deterioration of the organic materials, induced not only by age but also by the attack of the atmosphere, putty oils, paints, and the like, and also because of diffusion or leakage of moisture laden atmosphere through the organic materials themselves. Any seepage of moisture or other foreign material into the space between the glass sheets is objectionable because the inner surfaces of the glass become dirty or fogged and they are inaccessible for cleaning, even if such leakage is by way of diffusion or passage of the moisture through the organic materials themselves.

In accordance with the present invention, a novel process and apparatus is employed to produce an entirely new construction of a glazing unit of this character. Our new glazing unit avoids employment of organic materials in its construction by fabricating the unit entirely from glass and metal.

We do not claim in this application to be the originators of the broad idea of using metal separators between two sheets of glass to construct a glazing unit, but our structure embodies certain novel combinations, steps of processing, and details of construction which we consider vital to the production of a truly satisfactory and permanent form of glazing unit wherein the glass and metal are adequately bonded together in such a way that alternate expansion and contraction of the component parts of the unit or changes in atmospheric pressure will not result in its failure. Likewise, tests have shown that the materials used in the construction resist any detectable diffusion or leakage of air, moisture, or other foreign matter into the space or spaces between the glass sheets.

Broadly speaking, the glass sheets, after proper cleaning, are provided with metallic coatings around the border portions on one or both surfaces thereof. These metallic coatings are then given a coating of specially prepared solder or equivalent bond-inducing metallic material which is preferably applied in the presence of a suitable flux. A metallic separator strip of proper dimensions is then prepared by coating both sides thereof along the edges with a specially prepared solder or other bond-inducing metallic substance compatible with the solder coating on the glass, so that upon the application of heat the separator strips can be soldered or sweated to the coatings on the glass sheets. The width of the separator strip as well as the thickness of metallic coatings will of course determine the space between the two glass sheets being joined together into a single glazing unit. An important feature resides in the fact that the metallic coatings on the separator strip, when treated with heat to effect bonding between the separator strip and metallic coatings on the glass sheets, flow or move in a way to produce permanent fillets or reinforcing portions on both sides thereof to give a firm and permanent mechanical joint between the separator strips and metallized portions of the glass. Preferably, the separator strips are arranged slightly inward from the edges of the glass sheets in such a manner as to produce a channel or groove into which may be inserted a weather-resisting filler designed to give additional protection to the metal separator strip and coatings on the glass sheets to further protect it from deterioration and failure. The space so formed between the glass sheets is preferably dehydrated and may be filled with clean dry air at normal atmospheric pressure, or of course any other suitable gas or the like may be introduced, and the air or other gas, whichever is used, may be above or below normal atmospheric pressure.

In the drawings wherein like numerals are employed to designate like parts throughout the same.

Figure 1:
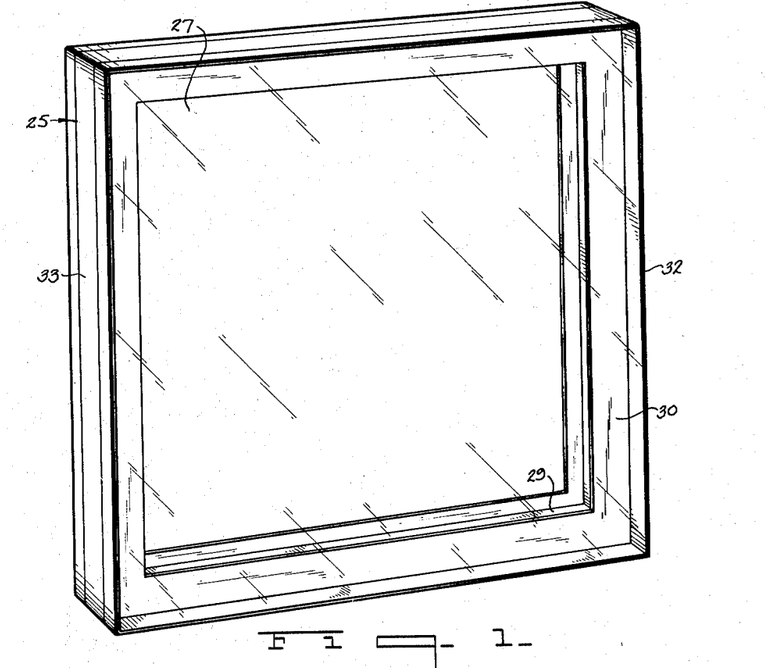
Fig. 1 is a perspective view of one form of finished glazing unit produced in accordance with our invention.
Figure 2:
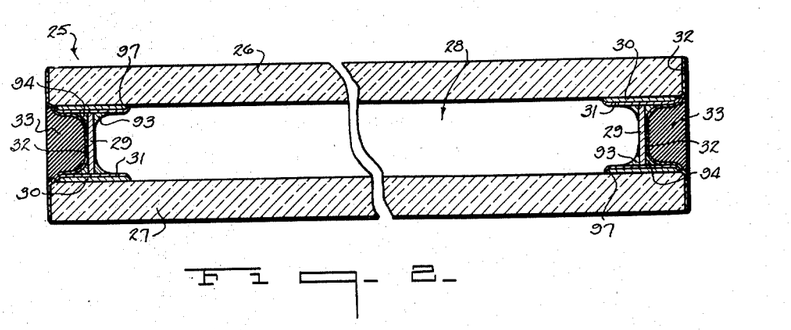
Fig. 2 is a vertical transverse section through such a finished glazing unit.

Referring to Figs. 1 and 2, the numeral 25 designates in its entirety a finished glazing unit produced in accordance with our invention. As will be readily appreciated, two or more sheets of glass can be fabricated into a glazing unit of this character, giving one or more spaces between adjacent glass sheets as occasion may require. For example, in ordinary buildings, a two sheet unit is satisfactory, while in refrigerators and such places it is desirable as a rule to make use of three or more sheet constructions. It will thus be understood that our invention is in no way confined to the exact number of glass sheets used or spaces between the sheets.

The glazing unit 25 consists generally of two sheets of glass 26 and 27 between which is an air space 28 created, broadly speaking, by the separator strips 29 joined to the glass sheets through the intermediary of the metallic coatings 30 and 31. The separator strips 29 are arranged inwardly of the outer edges of the glass sheets, forming a channel which may be coated with a lining 32 and then filled flush to the glass edges with a weather-proof seal 33.

In view of the fact that the inner surfaces of the glass sheets cannot be cleaned after the unit is made and installed, it is preferable to use glass which is stable when in use. Likewise, before the unit is completed, the inner surfaces of the glass sheets should be thoroughly cleaned not only for sake of appearance and permanency of unit, but also to facilitate application of the metal coatings upon the glass in a manner to get permanent and adequate adhesion or bond between the glass and metal.

Based on the work which we have done to date, we prefer that the coatings 30 on the glass, as shown, be produced from pure copper, and have found that pure copper can be sprayed upon the glass very satisfactorily. As will be shown hereinafter, it is important that the temperature of the glass be properly controlled at the time the metal is applied to it. It may be mentioned that bronze has also been used by us in lieu of the copper coating and no doubt other satisfactory metals or metal alloys or multiple coats of different metals can be substituted for the copper coating which is the material with which most of our work has been done.

For reasons, which will be more evident later, we also prefer that the separator strips 29 be made from lead and that the lead separator strip and copper coating be joined together by means of a specially prepared solder or other inorganic bonding material. This soldering of the parts together is, in effect, a sweat job, and the materials are so controlled, both as to composition and form, that reinforcing or strengthening fillets or accumulations of solder are formed on both sides of the separator strip to strengthen the construction and thus to help insure its permanency.

Figures 7, 9, 22:
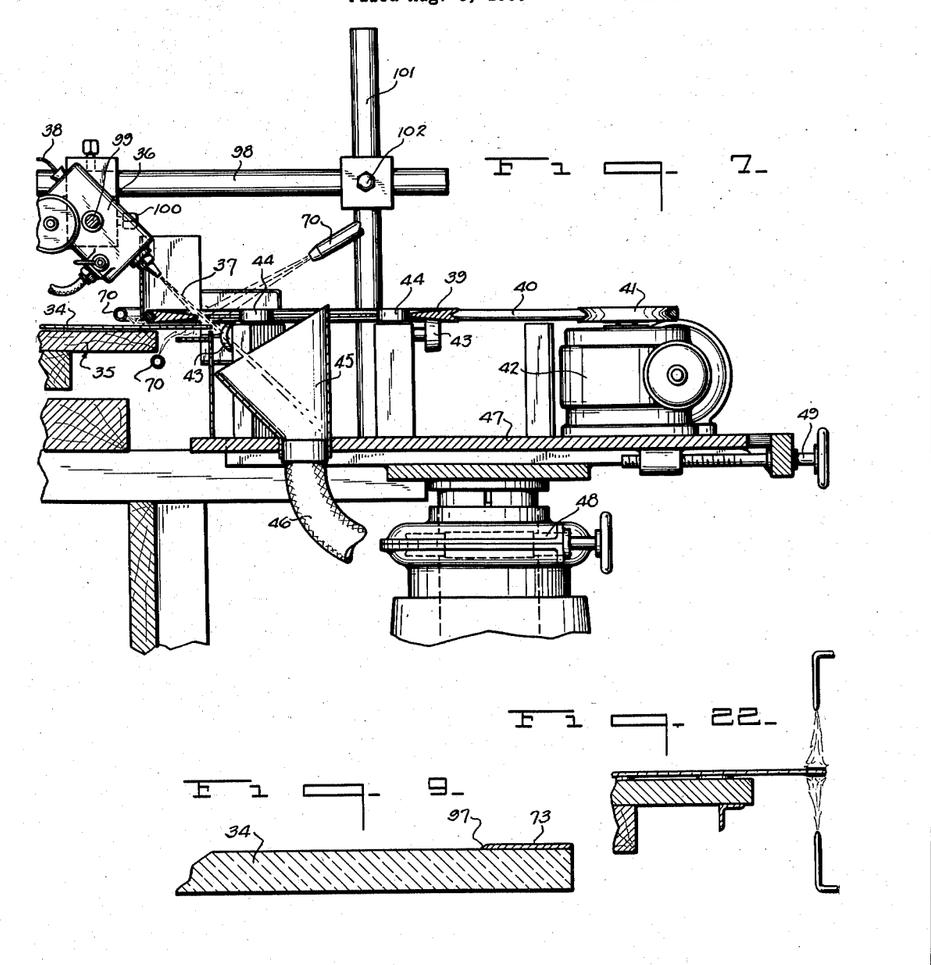
Fig. 7 is a vertical transverse sectional view of a portion of the apparatus taken on line 7—7 in Fig. 4.
Fig. 9 is a fragmentary vertical transverse section through a sheet of glass showing a metallic coating along the marginal portion of one edge thereof.
Fig. 22 shows the use of hydrogen flames to remove oxides from the metallic coatings.
Figure 8:
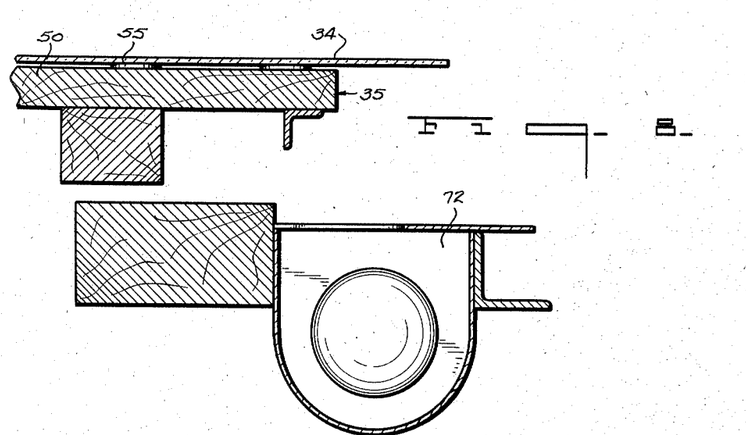
Fig. 8 is a sectional detail taken on line 8—8 in Fig. 4.

In Fig. 7 is illustrated that portion of our assembly table where the copper or other metal substance is applied to the marginal portions of the glass sheets. As shown, the glass sheet 34 rests upon and is carried by the conveyor 35. Disposed above the glass and conveyor is a metallizing gun 36 which may be of any construction capable of producing a spray of metal 37 which can be directed upon the preselected portions of the glass sheet moving thereunder. While it may be possible to apply the metal coating to the glass electrolytically or otherwise, we have had best results when using a spray gun in which the metal wire 38 is fed into the gun, melted, and sprayed in fine particles upon the glass. The deposit of metal upon the glass is not only controlled by the relative position of the gun with respect to the glass, speed of the wire through the gun, and speed of movement of the glass, but also by a guard member 39 designed for this particular purpose.

The guard member 39 comprises an annular ring member substantially V-shaped in cross section, with the thin edge disposed inwardly and terminating short of the edge of the glass to be coated, as is clearly shown in Fig. 7, and is provided with an edge groove adapted to receive the belt 40 driven by the gear 41 operated by motor 42. The ring is supported on the rollers 43 and held in proper position by the guide rollers 44. The guard 39 rotates rather slowly and, when arranged as shown in Fig. 7, serves as a mask for controlling the width of the sprayed strips upon the glass. The width of the metal coating so formed is dependent upon the relative position of the guard member with respect to the glass edge and can be made more narrow or wider by suitable adjustment. As shown, a trough 45 is provided to catch excess sprayed metal which is not deposited upon the glass. The trough 45 is connected by a conduit 46 to a suitable exhaust fan mechanism to carry away fumes, gases, etc. as will be appreciated. Ordinarily, some of the metal spray will tend to adhere to the ring and such deposit should be removed from time to time.

Figure 3:
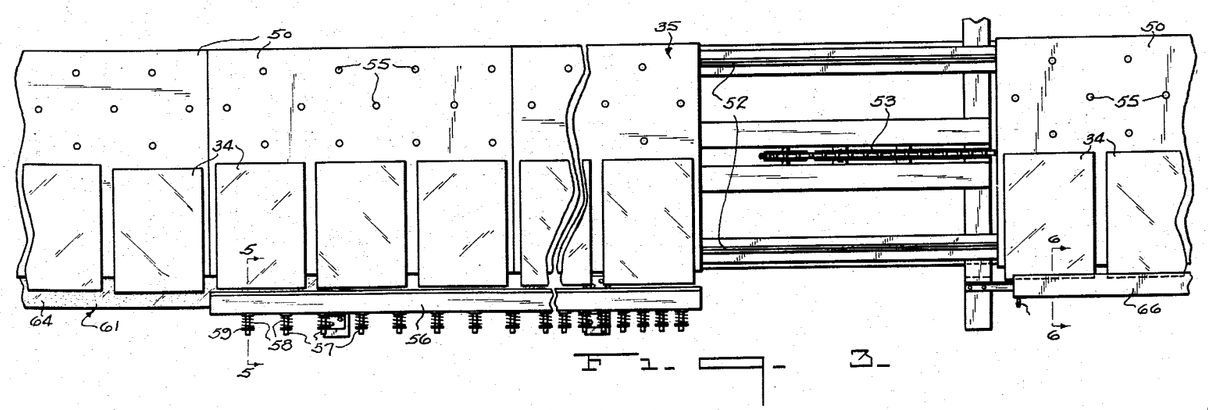
Fig. 3 is a fragmentary plan view of one form of apparatus which can be employed in the application of a metallic coating along the border portions of the glass sheets.
Figure 4:
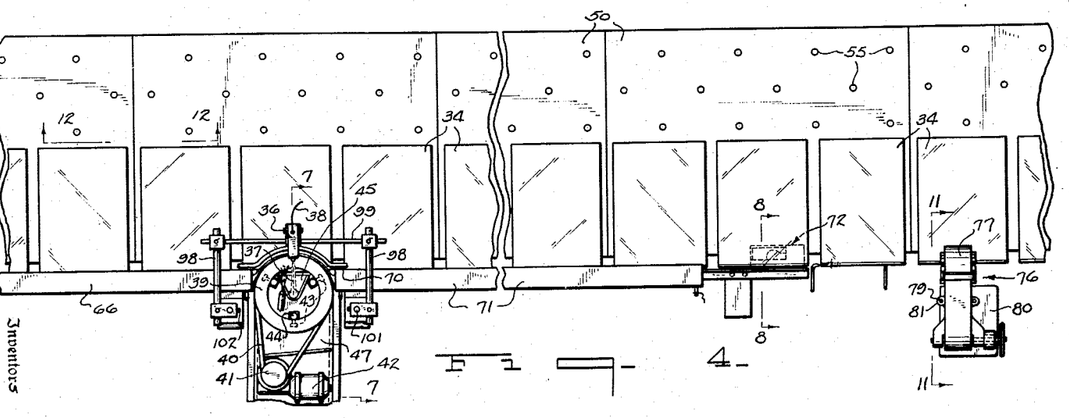
Fig. 4 is a similar view showing a continuation of the apparatus disclosed in Fig. 3.
Figure 12:
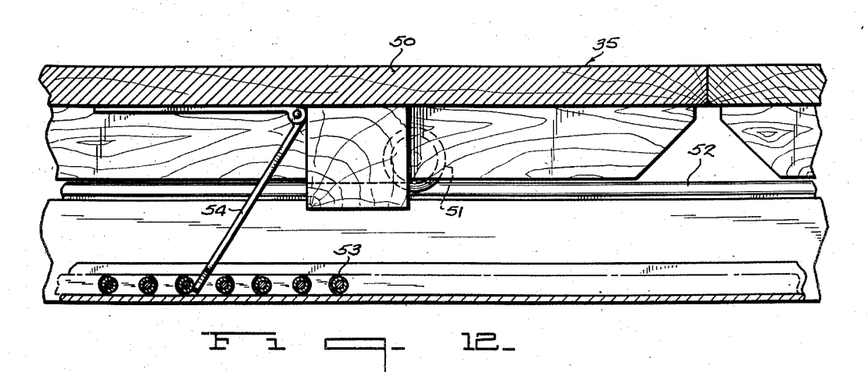
Fig. 12 is a section taken on line 12—12 in Fig. 4.

The guard ring and associated elements are shown as mounted on the platform 47 provided with the adjusting mechanism 48 for controlling the vertical adjustment of the guard member and associated parts, while lateral adjustment of the guard ring and other parts is controlled by the adjusting mechanism 49. As has already been mentioned, the glass sheet 34 is carried on the conveyor 35. Figs. 3 and 4 will give a better idea of the nature of the conveyor which may be used. The conveyor 35 comprises a series of tables or slats 50 which, as shown in Fig. 3, are carried on grooved rollers 51 operating on a track 52 and which are propelled forwardly by the chain drive 53. By referring to Fig. 12, it will be seen that each table 50 carries a pivoted latch 54 on its underside which is engaged by the chain drive 53 to advance the tables.

Figure 5:
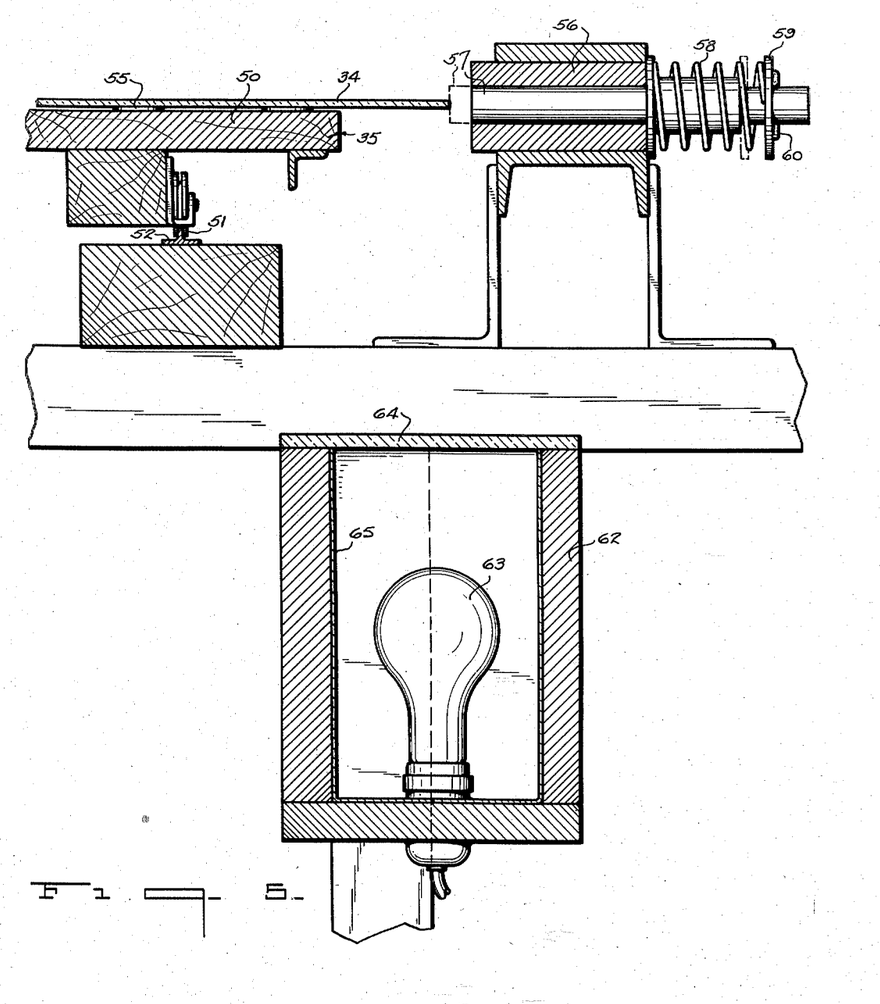
Fig. 5 is an enlarged vertical sectional detail taken on line 5—5 in Fig. 3.

The left hand end of the apparatus shown in Fig. 3 represents the starting end, and it will be noted that each table has spaced buttons 55 of rubber, felt, or other suitable material upon which the glass may rest and be handled without injury to the glass. The glass is placed upon the table, and as it is important that the glass be properly positioned, an aligning device is provided. This aligning device consists of an accurately positioned gauge bar 56 through which extend laterally a series of spring-pressed plungers 57 normally held in retracted position, as shown in Figs. 3 and 5, by the springs 58 operating between the washer 59 and the gauge bar. The washer 59 is retained in position by a cotter pin or the like 60. To line up the glass, it is placed close to the gauge bar and a number of the plungers are pushed in to their utmost extent, as indicated in dotted lines in Fig. 5, which moves the glass away from the gauge bar a predetermined distance. It is of course important that two or more of the plungers be operated on one piece of glass to insure that it is properly aligned. In Fig. 3 it will be noted that to the left of the gauge bar 56 is an inspection area 61, the details of which are given more fully in Fig. 5. Disposed under and along the edge of the conveyor tables is a light box 62 having a source of illumination 63 and preferably a cover glass of diffusing material such as ground glass 64. As a matter of economy, the box 62 is provided with a reflecting surface 65. The glass, therefore, is moved over the inspection box first to make sure that the surface to be coated has been thoroughly and properly cleaned. If the glass is not clean enough, it should be removed and recleaned before it is coated with the metal material. After inspection of the glass and proper alignment thereof with the gauge bar and associated parts, the conveyor moves to the right of Fig. 3, continuing through Fig. 4. The next step in the preparation of the glass is to heat the marginal portion of the edge to be coated, and this heating is of vital importance not only in preventing thermal shock of the glass itself, but also to enable a proper bonding of the metal to the glass.

The exact temperature used will vary somewhat with the size and thickness of glass, but in all cases care should be exercised to avoid warpage of the glass and heating should be confined to that area below the critical annealing point of the glass, it being borne in mind that the bond between the glass and the metal improves as the temperature of the glass is increased. Therefore, the temperature of the portion of the glass to be sprayed with metal is preferably as near the critical annealing point of the glass as is practically possible. For ordinary plate and window glass we have found a temperature of approximately 850 degrees Fahrenheit should not be exceeded as detrimental strain might be left in the glass, and in actual practice we have operated within the approximate range of 500 degrees to 600 degrees Fahrenheit. On the other hand, if we were to heat the entire sheet instead of just the edge portions, then the edge portions could be heated higher. For example, if the entire sheet were to be heated to 500 degrees or 600 degrees Fahrenheit, then the edge portions to be sprayed could be heated to about 850 degrees Fahrenheit without much danger of breakage or other troubles, but we prefer to avoid heating the whole sheet, especially in view of our discovery that the edge of the glass can be heated to a relatively high temperature, with satisfactory results, without heating the remainder of the sheet. Heating of the glass in this way prior to spraying of the metal results in an excellent bond between the glass and metal.

Figure 6:
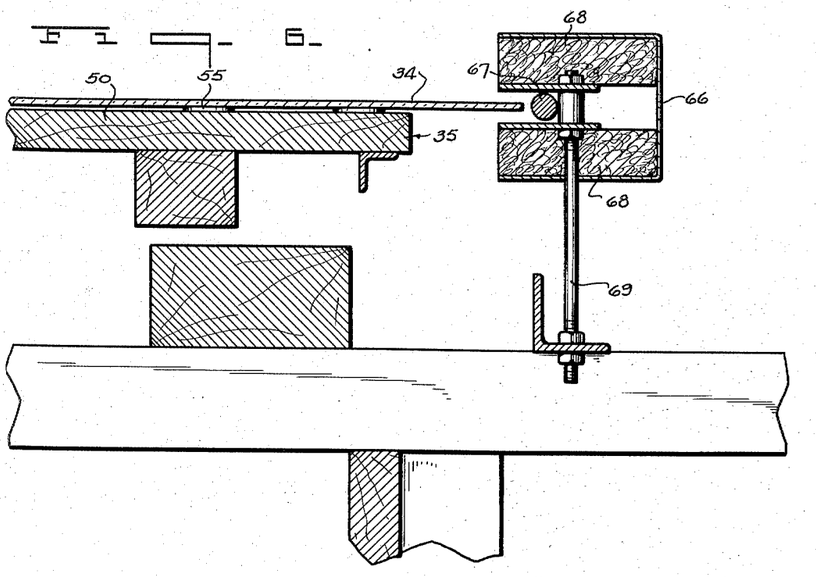
Fig. 6 is another enlarged vertical sectional detail taken on line 6—6 in Fig. 3.

As shown in Figs. 3 and 6, the edges of the glass pass through the heating members 66 with no part of the heating device actually touching the glass surface to be coated. The heating member may comprise an electrical resistance unit 67 and insulated cover plates 68 carried on the supports 69. In lieu of or in addition to the electrical heating elements 67, gas burners may be employed, and in any event we prefer to use gas burners in the vicinity of the metallizing gun, the burners 70 being shown in Fig. 7. The number of heaters and length of heating zone are dependent naturally upon the speed of the machine and exact operating temperatures desired. We prefer that heating be done as rapidly as possible and confined to a narrow strip at the edge of the glass. This serves to confine the compressional strain to a narrow band and helps to prevent warping and breaking of the glass. After the glass passes beyond the heating members 66 and just before the metal is sprayed thereon, it is subjected to the action of the burners 70 which heat the surface of the glass to the desired maximum temperature for the reception of the metal spray. The units are controlled so that when the glass reaches a position under the gun, it is within the predetermined temperature range desired and the importance of which has already been mentioned.

The conveyor is moved continuously and successive sheets of glass are presented progressively to the spray of metal issuing from the gun 36.

Attention is directed to the fact that in Fig. 4, to the right of the metal spraying equipment, heaters 71 are shown and these are important because their use permits gradual lowering of the glass temperature to that of the surrounding atmosphere. This is in effect an annealing of the metallized glass edge portion. As the glass is carried by the conveyor and leaves the annealing heaters 71, the treated edge passes over a second inspection lamp 72. If the coating is satisfactory, the glass is left on the conveyor and will have an appearance similar to that shown in Fig. 9, wherein the glass sheet 34 has a coating on one surface designated by the numeral 73.

Figure 10:
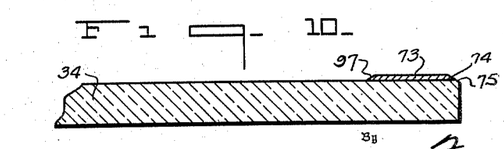
Fig. 10 is a view similar to Fig. 9 after the metallic coating and corner of the glass sheet have been abraded or otherwise treated to produce a feather edge.

An important part of our process and unit involves the treatment of the metallic coating to taper the coating off to give what we term a feather edge. This is illustrated diagrammatically in Fig. 10 where the metallic coating 73 has been abraded or otherwise treated to miter or bevel the corner or edge 74, and likewise the edge of the glass itself is removed to a slight extent to give the bevel portion 74.

This tapering would in all probability be unnecessary if the sprayed metal and glass possessed the same coefficient of expansion, but they are generally different so that when the glass and metal cool together after the spraying process, the relatively greater contraction of the metal may tend to peel off with an adhering thin layer or coat of glass. We have observed that whenever peeling off occurs, it starts at the weakest spot namely, the outer edge of the glass, but such tendency to peel off is overcome by tapering the copper coat at the edge, thus reducing its strength in proportion to the thickness removed and in thus lessening the strain in the glass. It will thus be evident that we prefer to feather edge the copper in the manner shown and described, the degree or extent of tapering being controlled to some extent by the variation in coefficient of expansion that exists between the glass and metal used.

Figure 11:
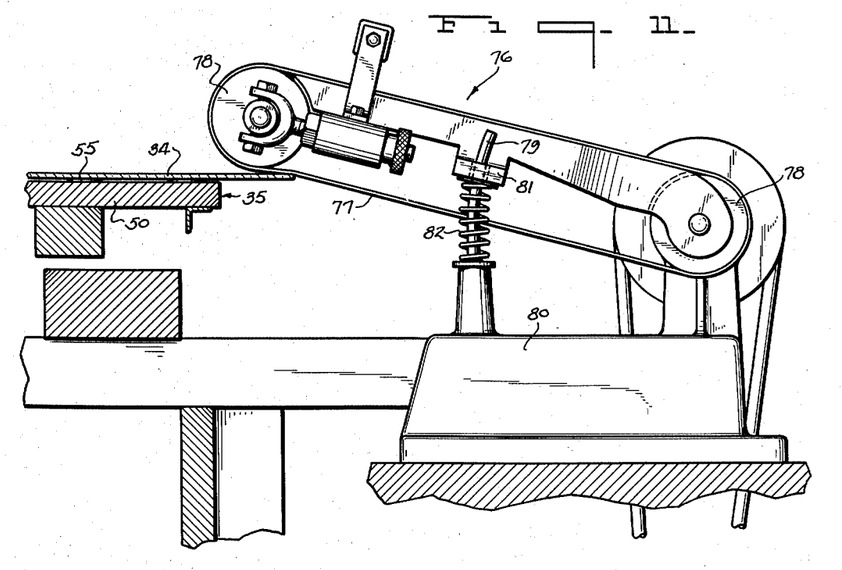
Fig. 11 is an enlarged view of one form of device which can be employed in producing the feather edge shown in Fig. 10, Fig. 11 being taken on line 11—11 in Fig. 4.
Figure 13:
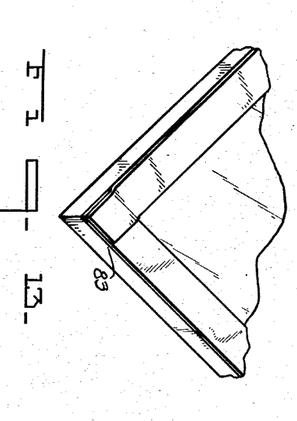
Fig. 13 is a fragmentary perspective view illustrating how the metallic layer along one edge may be permitted to overlap the similar layer along the adjacent edge.

A satisfactory device for forming the feather edge on the metallic coating 73 and glass is shown at 76 in Fig. 4 and more in detail in Fig. 11. In Fig. 11 the feather edge producing device comprises an abrading belt 77 carried by the rollers 78, one of which is a positively driven roller and the other of which is an adjustable roller to maintain the proper tensioning of the belt. To attain the desired feathering or mitering of the metallic coating and glass edge, the abrading belt is mounted at an angle as is clearly illustrated in Fig. 11, with the belt and associated parts being mounted to pivot on the axis of the lower and driven roller 78. A curved guide 79 is carried by the support 80 of the feather edging device and operates through an opening formed in the lip 81. A spring 82 is provided between the lip 81 and support 80 so that the abrading belt is allowed to float gently upon the edge of the glass, with sufficient pressure being applied to insure abrading of the metallic coating and glass. The degree of miter can be controlled by the angle of inclination of the abrading belt as it works upon the glass edge and also by the effective pressure of the belt upon the glass. After one edge or marginal portion of the glass sheet has been coated and feather edged, it is of course necessary to similarly treat the remaining edges or marginal portions before fabricating the glass into the glazing unit. Originally we thought it would be necessary to prevent overlapping of the sprayed metal at the corners of the glass, but practice has shown this not to be so. In Fig. 13 is illustrated at 83 the manner in which the sprayed coatings may be allowed to overlap.

To further prepare the metal coating on the glass after the feathering operation, we apply a layer of relatively softer metal, and this may be in the nature of a solder composition. The make-up of this solder or other bond-inducing metal is quite important.

In producing our unit, two solders are used one for application to the metal coating on the glass surface, and the other to build up a volume of solder on the edges of the separator strip.

The use of ordinary solders results in relatively high working temperatures with the soldering irons or other sources of heat whereby undesirable strains are set up between the copper coat and the glass. We use a low melting point solder with a wide plastic range of melting so that we reduce the temperature of applications and make use of a more plastic range of the solidifying points of the solder for the purpose of easier assembly.

There are a number of variations of soft solders which can be used but we favor use of a solder which tests have indicated has the least alloy reaction or electrolytic action, and it consists of approximately 33 parts of bismuth, 25 parts of lead, and 42 parts of tin.

Figure 14:
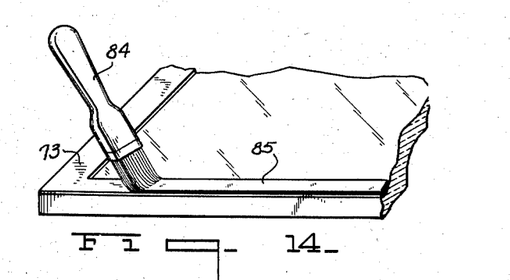
Fig. 14 is a fragmentary perspective view illustrating diagrammatically the application of flux material to the metallic coating on the glass.
Figure 15:
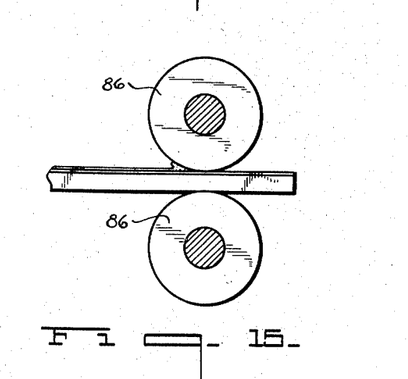
Fig. 15 is a diagrammatic vertical sectional view showing one way in which excess flux can be removed.
Figure 16:
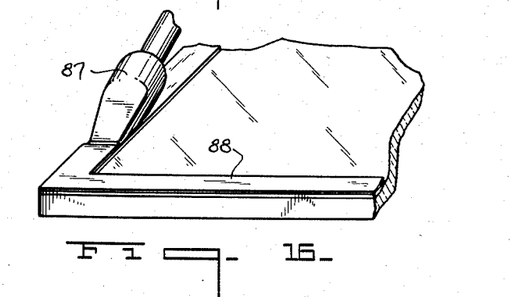
Fig. 16 is a fragmentary perspective view illustrating the depositing of solder upon the metallized portion of the glass.

As a matter of precaution and to insure the utmost of cleanliness, a flux may be and preferably is used to get a permanent satisfactory union between the solder layer and the metal coating on the glass. Zinc chloride dissolved in water makes an excellent flux and ordinarily we prefer to make it as dilute as possible. One form of flux can be applied as a liquid, this being shown diagrammatically in Fig. 14 where the brush 84 is being used to coat the metallic coating 73 with a film or flux material 85. To remove excess flux, the coated glass may be passed between a pair of rollers 86 as shown in Fig. 15. The flux treated metallic coating 73 may then be covered with a layer of solder which is shown in Fig. 16, wherein the soldering iron 87 is being run over the metallic coating to leave the solder layer 88.

It may be well to again emphasize the importance of cleanliness and lack of contamination of the various metal coatings and components going into our improved glazing unit. Care should be exercised in preventing soiling of the metallic coating 73 on the glass and again the solder coating should not be exposed to dirt or other influences that might adversely affect the coatings on the glass.

It has been found that two to three minutes time must elapse after treating the copper surface with the flux and before the soldering operation can be carried on. We have recently reduced the copper oxides by the application of a hydrogen flame to the copper surfaces shortly after the coated glass has left the heating elements. The hydrogen must be burning as a reducing flame and also the glass must not be too hot before it passes under this flame, otherwise reoxidation takes place. When this is done, the weaker solutions of flux may be used without any time lost for the reaction of the flux to take place. It is also desirable that the glass be not completely cooled since the reaction of the hydrogen flame to the copper oxides is more rapid and complete. The use of hydrogen flames is illustrated in Fig. 22.

The separator strip 29 is preferably made of lead. We have found pure lead strips to be too susceptible to alloy action and melting under the action of the solders, so use lead containing 3% of antimony providing a slightly stiffer lead strip and capable of greater abuse in the soldering operations, as no doubt the mixture has a higher melting point than the lead alone. We have used 1/64" and 1/32" thick lead strips, but the thinner thickness presented too great a difficulty in the soldering operations with rapid melting down due to soldering iron temperatures and alloy action with the solder. The thicker lead strips overcame these difficulties but in certain sizes and lengths appeared to have too much rigidity. We are now using a thickness midway between, namely, .024" with satisfactory results from both strength and workability, but obviously the thickness can be varied as desired.

Figure 17:
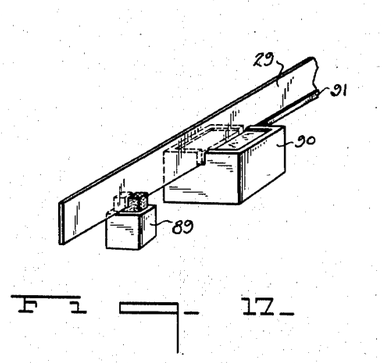
Fig. 17 is a perspective view illustrating the deposition of solder or other bond-inducing material along the marginal portions of the separator strip.
Figure 18:
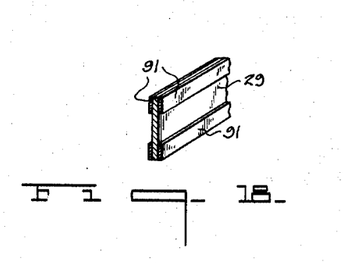
Fig. 18 is a fragmentary perspective detail showing the separator strip after it has been precoated in the desired manner with the solder.

To enable joining together of the separator strips to the metal coated glass sheets, we apply to both sides of the strip along the marginal edges thereof, first a flux and then a deposit of solder. As shown diagrammatically in Fig. 17, the strip 29 may be passed first through the flux applying device 89 and then through a container of molten solder 90. Any other preferred means of building up the solder deposits on the strip 29 may of course be employed. Fig. 18 indicates approximately the appearance of the separator strip 29 after it has been prepared with the solder deposits 91. The strip is now ready for its association with the glass sheets.

In applying the solder to the edges of the lead tape, we have a delicate situation because of the low melting point of the lead and the rapid alloy action of the lead with most solders. For this purpose, we are using a lower melting point solder than above described made of 20 parts of bismuth, 40 parts of lead, and 40 parts of tin. This solder has a wide plastic range with a minimum plastic temperature of approximately 209° F.

The advantage of using these low melting point solders is also of benefit during the time of sweating the soldered copper surface to this soldered lead edge whereby a low temperature iron may be used without melting down the lead strip.

In an attempt to arrive at a proper flux for soldering both on the copper and lead surfaces, all common types of fluxes, such as rosin, stearic acid, etc., have been used. Included in these fluxes were ammonium chloride and zinc chloride. We have used both separately and in eutectic proportions.

The eutectic mixtures appear to etch the glass and offer difficulty in cleaning. We therefore adopted zinc chloride as a flux in solution in water and diluted with alcohol to give the proper reaction. The use of a hydrogen flame to reduce the copper oxides of the copper applied to the glass surface, as elsewhere described, permits the weaker flux. We prepare this weak flux by first obtaining a saturated zinc chloride and water solution at room temperature and then diluting this solution, one part of the solution to five parts of alcohol. The purpose of this is to spread the zinc chloride evenly in a small quantity over the entire surface to be soldered to provide a carrying liquid of low boiling point readily evaporated under the heat of the soldering iron. The dilute flux also has less tendency to etch the glass than the concentrated one.

Figure 19:
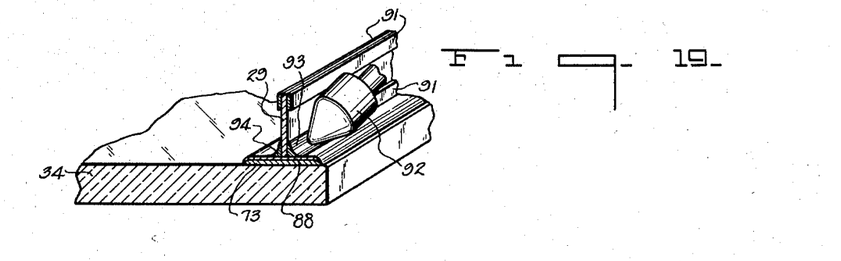
Fig. 19 is a fragmentary perspective view showing bonding or sweating of the separator strip to one sheet of glass.

To join the prepared separator strip 29 to the glass 34, it is placed in a position substantially as shown in Fig. 19. Any suitable jigs or other means may be employed to facilitate proper positioning of the separator strip with respect to the glass. Ordinarily, it is desirable to place the separator strip 29 back from the edge of the glass sheet and approximately centrally of the metal coating 73 to produce the channel for receiving the weather-proofing material. This, of course, is a matter of choice. An electric iron 92 or other heating means may be employed to elevate the temperature of the solder deposits 91 and the solder coating 88 to induce flowing of the solder to produce a fillet 93 on one side of the separator strip 29 and a second fillet 94 on the opposite side of said separator strip. In other words, the precoated lead separator strip, provided with a specially prepared solder composition having desirable properties as to melting and hardening points, ductility, and freedom from porosity, allows soldering of the coated lead separator to the glass previously coated with copper or other metal and solder in such a way that the solder completely surrounds the edge of the lead separator strip, giving what may be called a sweat joint and producing fillets on both sides of the separator strip to give a balanced type of joint capable of standing strain and stresses in both directions laterally of the separator strip.

For purposes of illustration, the fillets 93 and 94 are shown as separate from the solder coating 88 on the metallized film 73, while these solder deposits are of course independent of one another initially, part of the solder being applied originally to the separator strip and other solder being applied to the metallized coating on the glass. During the joining together as shown in Figs. 19 and 20, the solder of course blends or amalgamates into a single mass or volume of solder permanently adherent to the separator strip and metallized coating on the glass and shaped as fillets for mechanical strength as explained.

In joining the separator strip to the first sheet of glass, it is obviously possible to apply the iron to both sides of the separator strip for soldering purposes, but this of course is impossible when the second sheet of glass is being joined to the separator strip. However, by preparing the separator strips 29 with substantial deposits of solder on both sides thereof in a manner such as is illustrated in Fig. 18, the heat applied on one side of the separator strip is sufficient to cause proper flowing of the solder on both sides. That is, in Fig. 19, proper control of temperature application with the iron 92 in the manner shown will result in the formation of not only the fillet 93 on that side of the separator strip being in contact with the iron, but will also result in formation of the fillet 94 on the opposite side of the separator strip. It has been found that the separator strip can be soldered to one sheet of prepared glass in the manner shown and rapidly enough that the solder deposits along the other edge of the coating will not be disturbed, leaving them in proper condition for joinder to the second sheet of glass.

Figure 20:
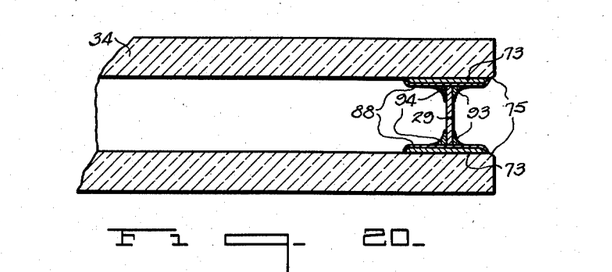
Fig. 20 is a fragmentary transverse vertical section through the unit after the separator strip has been secured in position between the two glass sheets.

After the separator strip has been joined to the first sheet of glass, the assembly so formed is then preferably inverted over the second sheet of glass, as shown in Fig. 20, and the soldering job completed by operating the iron or other heating element on the exterior coating of solder carried by the separator strip. This, as has already been explained, will result in sweating together or joining of the separator strip and prepared metal coatings on the glass as well as formation of the fillets 93 and 94. We have found that one length of separator strip 29 can be used around the entire perimeter of the glass sheets and the meeting ends of the strip can easily be soldered together to produce an air-tight and moisture-proof space between the glass sheets. However, it is not necessary that one continuous length of separator strip be used as one strip can be used for each side and the meeting ends of the independent strips soldered or sweated together.

Figure 21:
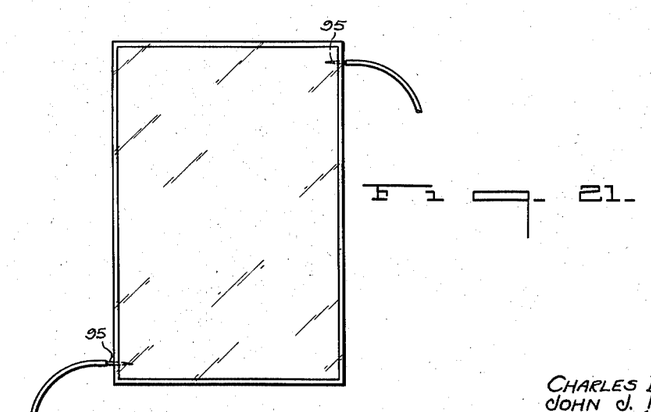
Fig. 21 illustrates diagrammatically dehydration of the air space between the glass sheets and introduction of proper gas or evacuation of said air space.

After the glass sheets and separator strip have been joined together and to insure desired permanency, it is preferred to establish a predetermined air or gas condition within the space between the glass sheets. To accomplish this, the separator strips may be punctured at two or more points to permit insertion of hypodermic needles 95 or other instruments which allow passage of dehydrated air through the space to prevent later condensation within the space or fogging of the unit when in use. In most cases, dehydrated air at normal atmospheric pressure will be satisfactory. For other uses, a partially evacuated condition or even a pressure above atmospheric pressure may be desirable. Likewise, inert gases may be sealed within the unit for some uses. A simple method of controlling pressure or lack of pressure within the unit is to control the temperature of the unit and gas during dehydration and just prior to sealing of the openings through which the needles are inserted. After the gas content has been established and immediately upon withdrawal of the needles from the separator strips, the openings are soldered to prevent ingress or egress of gas.

The unit is then ready for use and can be installed without further preparation. However, we prefer to protect the metal and the bond between the metal and the glass as much as possible from adverse conditions, and therefore apply a weather-proofing paint or varnish, lining, or coating 32, as shown in Fig. 2, and after drying the remaining part of the channel is filled with the rubber, putty, or other weather-proof material 33.

To avoid electrolytic action or other undesirable reactions between the component parts of the construction, care should be exercised in selecting the materials to be used as the coatings on the glass, the separator strips, and the bonding means for joining the separator strip to the metallized coatings on the glass. Likewise, the metallized coatings on the glass should exhibit permanent adherence not only toward the other metallic components but also toward the glass sheets themselves. When using pure copper for the metallized coatings, lead compositions as mentioned above for the separator strips, and solder compositions as indicated, a thoroughly satisfactory unit is produced.

It will be noted that the outer portions of the metallized coatings are abraded to produce a feather edge. The inner edges of the metallized coatings on the glass are likewise feather edged as shown at 97 in Fig. 2. The creation of this feather edge is possible without resorting to abrasion treatment and can easily be handled by proper positioning of the metallizing gun with respect to the glass and guard member 39 illustrated in detail in Fig. 7. As shown in Fig. 7, the gun 36 is mounted on a horizontal shaft 98 and is slidable thereon with respect to the glass being coated. The gun is rotatable about the shaft 99, being held in proper position by the adjusting screw 100. The unit as a whole as well as the shaft 98 are vertically adjustable on the standard 101, being locked in proper position by the locking bolt 102. Care should be used in determining the angularity of the discharge nozzle of the metallizing gun so that the metal deposit 73 formed on the glass will be of substantially uniform thickness and have the tapered or feather edge 97.

The fillets 93 and 94 constitute an important part of the construction. We have made units in which the metal separator strips have not been precoated with solder but have merely been soldered to the metallized coatings in a way that no substantial fillet was formed on either side of the separator strip. Likewise, we have made other units in which a substantial fillet has been produced on the outer side of the separator strip but not on the inner side. Such joints appear to be mechanically sound and for ordinary purposes would be adequate. However, thorough and critical research work has shown that the separator strips and metallized coatings on the glass are subjected to amazingly high degrees of strain and stresses and a joint which appears perfectly satisfactory will break down when the units are subjected to either normal use or accelerated tests.

The stresses and strains involved in a unit of this kind also make it difficult to obtain a bond between metal and glass which will stand up. Another important feature of our construction as herein described lies in the fact that the precoated separator strips allow both outside and inside fillets of solder to be formed. This broader base of adhesion distributes the forces that may be exerted on the glass over a greater area, and these forces are conducted through the ductile medium of solder. These factors, therefore, serve effectively to reduce the strain between the metal and the glass.

With our construction, the metallized coatings and separator strips do not literally constitute a rigid, non-yielding unit, but rather are composed of separate elements joined together with solder or other material of sufficient magnitude to give adequate strength but yet ductile enough to compensate at least in part for some of the stresses and strains to which the glazing unit as a whole is subjected when in use. It is of course still important that the metallized coatings be firmly adherent to the glass sheets and that such line of joinders be capable of resisting to a high degree any tendency for the glass and metal to separate, but by removing some of the lead, so to speak, from said joinder, the glazing unit is much more satisfactory than in those cases where the entire load is on the line of joinder.

The importance of the inside fillets cannot be over-emphasized because we have actually made up experimental units provided with exterior fillets only and have subjected said units to accelerated tests, including alternate hot and cold treatment to first one side and then the other side of the unit and have found that the separator strip will pull away or become separated from the metallized coatings on the glass. This form of separation is entirely eliminated when providing fillets on both sides of the separator strip substantially as shown in the drawings.

It will be understood that by careful selection and preparation of materials as herein described, and by following the procedure suggested, an extremely satisfactory commercial product can be easily made. Certain features should be borne in mind; for example, the differential heating of the glass edge above that of the main body of the glass is important because heating of the glass edge gives an improved bond over cases where the glass is not heated at all, and by confining the heat to the edge instead of heating the entire sheet, manufacturing costs are kept low. Other points are: choice of a suitable material for spraying on the glass to give a permanent bond; a flexible or ductile separating strip to take up differences of expansion, contraction, and strains on the entire assembled unit; the formation of inside and outside fillets along each edge of the separating strip to broaden out the strain on the copper surface; freedom from back spray on the glass surfaces adjacent to the coated portion by using the shield to keep a well defined margin of copper deposit on the glass in conjunction with the angle of the metallic spray; feather edge of the coating; and the filling of the edge groove to protect the unit from weathering, etc.

A separate application has been filed to cover the apparatus herein disclosed which is used in the fabrication of the multiply glass sheet glazing units, said application being Serial No. 365,132, filed November 9, 1940, entitled "Apparatus for use in the fabrication of multiply glass sheet glazing units."

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. A multiply glass sheet glazing unit of the character described, comprising a plurality of parallel spaced glass sheets, a sprayed metal ribbon arranged around the marginal portions of the opposed surfaces of said glass sheets and firmly adherent thereto, a flexible-ductile metal separator strip arranged entirely around the marginal portions of said glass sheets and lying between the metal ribbons on the glass sheets, and low melting point metal fillets carried by the separator strip on both sides thereof and along both edges thereof, said fillets being firmly united to the metal ribbons on the glass along both the inside and outside of each edge of the separator strip in a manner to create a hermetically sealed space between adjacent sheets of glass.

2. A multiply glass sheet glazing unit of the character described, comprising a plurality of parallel spaced sheets, a sprayed copper ribbon arranged around the marginal portions of the opposed surfaces of said glass sheets and firmly adherent thereto, a flexible-ductile metal separator strip arranged entirely around the marginal portions of said glass sheets and lying between the copper ribbons on the glass sheets, and low melting point metal fillets carried by the separator strip on both sides thereof and along both edges thereof, said fillets being firmly united to the copper ribbons on the glass sheets along both the inside and outside of each edge of the separator strip in a manner to create a hermetically sealed space between adjacent sheets of glass.

3. A multiply glass sheet glazing unit of the character described, comprising a plurality of parallel spaced glass sheets, a sprayed metal ribbon arranged around the marginal portions of the opposed surfaces of said glass sheets and firmly adherent thereto, said metal ribbons having a feather edge at the edges of the glass, a flexible-ductile metal separator strip arranged entirely around the marginal portions of said glass sheets and lying between the metal ribbons on the glass sheets, and low melting point metal fillets carried by the separator strip on both sides thereof and along both edges thereof, said fillets being firmly united to the metal ribbons on the glass along both the inside and outside of each edge of the separator strip in a manner to create a hermetically sealed space between adjacent sheets of glass.

4. A multiply glass sheet glazing unit of the character described, comprising a plurality of parallel spaced glass sheets, a sprayed copper ribbon arranged around the marginal portions of the opposed surfaces of said glass sheets and firmly adherent thereto, a flexible lead separator strip arranged entirely around the marginal portions of the glass sheets and lying between the copper ribbons on the glass sheets, and low melting point metal fillets carried by the lead separator strip on both sides thereof and along both edges thereof, said fillets being firmly united to the copper ribbons on the glass sheets along both the inside and outside of each edge of the separator strip in a manner to create a hermetically sealed space between adjacent sheets of glass.

5. A multiply glass sheet glazing unit of the character described, comprising a plurality of parallel spaced glass sheets, a sprayed copper ribbon arranged around the marginal portions of the opposed surfaces of said glass sheets and firmly adherent thereto, a flexible lead separator strip arranged entirely around the marginal portions of the glass sheets and lying between the copper ribbons on the glass sheets, and low melting point solder fillets carried by the lead separator strip on both sides thereof and along both edges thereof, said solder fillets being firmly united to the copper ribbons on the glass sheets along both the inside and outside of each edge of the separator strip in a manner to create a hermetically sealed space between adjacent sheets of glass.

6. A multiply glass sheet glazing unit of the character described, comprising a plurality of parallel spaced glass sheets, a copper ribbon arranged around the marginal portions of the opposed surfaces of said glass sheets and firmly united thereto, a layer of solder adherent to the copper ribbon, a flexible-ductile metal separator strip arranged entirely around the marginal portions of said glass sheets and lying between the solder coated copper ribbons on the glass sheets, and low melting point solder fillets carried by the separator strip on both sides thereof and along both edges thereof, said fillets being firmly united to the copper ribbons through the intermediary of solder along both the inside and outside of each edge of the separator strip in a manner to create a hermetically sealed space between adjacent sheets of glass.

7. A multiply glass sheet glazing unit of the character described, comprising a plurality of parallel spaced glass sheets, and a substantially H-shaped metal member lying between the marginal portions of adjacent sheets of glass and firmly adherent to said sheets of glass, said H-shaped member comprising a web of flexible-ductile metal soldered to metallic coatings on the glass sheets through the intermediary of solder fillets extending along both the inside and outside of each edge of said metal web.

8. A multiply glass sheet glazing unit of the character described, comprising a plurality of parallel spaced glass sheets, and a substantially H-shaped metal member lying between the marginal portions of adjacent sheets of glass and firmly adherent to said sheets of glass, said H-shaped member comprising a flexible lead web connected to copper bands through the intermediary of low melting point solder fillets extending along both the inside and outside of each edge of the lead web, and said H-shaped member being united to the glass sheets in a manner to create a hermetically sealed space therebetween.

9. The process of producing a multiply glass sheet glazing unit of the character described, comprising the steps of successively heating and spraying the marginal portions of glass sheets with copper to form closely adherent copper ribbons around the marginal portions of the glass sheets, abrading the copper ribbons to produce a feather edge, then soldering a flexible lead strip with low melting point solder between copper ribbons on parallel spaced glass sheets by the application of heat sufficient to produce solder fillets on both sides and along both edges of the lead strip in a manner to create a hermetically sealed space between adjacent sheets of glass, and then dehydrating said space.

10. The process of producing a multiply glass sheet glazing unit of the character described, comprising the steps of spraying a metallic ribbon around the marginal portions of two sheets of glass, precoating a strip of flexible-ductile metal with deposits of low melting point solder on both sides and along both edges thereof, arranging the precoated metal strip between the two sheets of glass, and then joining the metal strip to the glass sheets by application of heat sufficient to induce flowing of the solder deposits on said metal strip and cause uniting thereof with the metallic ribbons on the glass sheets in a manner to produce fillets along both the inside and outside of each edge of the said metal strip to create a hermetically sealed space between the sheets of glass.

11. The process of producing a multiply glass sheet glazing unit of the character described, comprising the steps of spraying a metallic ribbon around the marginal portions of two sheets of glass, precoating a strip of flexible-ductile metal with deposits of low melting point solder on both sides and along both edges thereof, arranging the precoated metal strip between the two sheets of glass, then joining the metal strip to the glass sheets by application of heat sufficient to induce flowing of the solder deposits on said metal strip and cause uniting thereof with the metallic ribbons on the glass sheets in a manner to produce fillets along both the inside and outside of each edge of the said metal strip to create a hermetically sealed space between the sheets of glass, and then dehydrating the space between the glass sheets.

12. The process of producing a multiply glass sheet glazing unit of the character described, comprising the steps of spraying a metallic ribbon around the marginal portions of two sheets of glass, covering said metallic ribbons with films of solder, precoating a strip of flexible-ductile metal with deposits of low melting point solder on both sides and along both edges thereof, arranging the precoated metal strip between the two sheets of glass, and then joining the metal strip to the glass sheets by application of heat sufficient to induce amalgamation of the solder deposits on the metal strip with the solder films on the metallic ribbons in a manner to produce fillets along both the inside and outside of each edge of the said metal strip whereby to create a hermetically sealed space between the sheets of glass.

13. The process of producing a multiply glass sheet glazing unit of the character described, comprising the steps of applying a metallic ribbon around the marginal portions of two sheets of glass, arranging the glass sheets in spaced parallel relation with the metallic ribbons thereon facing one another, positioning a metal strip between the glass sheets inwardly of the edges thereof and also inwardly of the edges of said metallic ribbons, and then soldering the metal spacer strip to the metallic ribbons on the glass sheets by the use of solder and the application of heat sufficient to produce solder fillets firmly united to said metal spacer strip and metallic ribbons to create a hermetically sealed space between the sheets of glass.

14. The process of producing a multiply glass sheet glazing unit of the character described, comprising the steps of applying a metallic ribbon around the marginal portions of two sheets of glass, arranging the glass sheets in spaced parallel relation with the metallic ribbons thereon facing one another, positioning a metal strip between the glass sheets inwardly of the edges thereof and also inwardly of the edges of said metallic ribbons, then soldering the metal spacer strip to the metallic ribbons on the glass sheets by the use of solder and the application of heat sufficient to produce solder fillets firmly united to said metal spacer strip and metallic ribbons to create a hermetically sealed space between the sheets of glass, and then dehydrating the space between the glass sheets.

15. The process of producing a multiply glass sheet glazing unit of the character described, comprising the steps of applying a metallic ribbon around the marginal portions of two sheets of glass, applying coatings of solder to the metallic ribbons, precoating a metal strip on both sides and along both edges thereof with deposits of solder, arranging the glass sheets in spaced parallel relation with the metallic ribbons thereon facing one another, positioning the precoated metal strip between the glass sheets inwardly of the edges thereof and also inwardly of the edges of said metallic ribbons, and then joining the precoated metal spacer strip to the solder coated metallic ribbons on the glass sheets by the application of heat sufficient to induce flowing and amalgamation of the solder deposits on said metal spacer strip with the solder coatings on said metallic ribbons and the formation of solder fillets along both the inside and outside of each edge of the said metal spacer strip to create a hermetically sealed space between the sheets of glass.

16. A multiply glass sheet glazing unit of the character described, comprising two spaced parallel sheets of glass, metallic ribbons arranged around the marginal portions of the opposed surfaces of said glass sheets and firmly adherent thereto, a metal spacer strip arranged between the glass sheets and positioned inwardly of the peripheral edges of said sheets and also inwardly of the edges of said metallic ribbons, and metal fillets firmly adherent to the metal spacer strip and metallic ribbons on the glass sheets for securing them together in a manner to create a hermetically sealed space between the sheets of glass.

17. A multiply glass sheet glazing unit of the character described, comprising two spaced parallel sheets of glass, sprayed metallic ribbons arranged around the marginal portions of the opposed surfaces of said glass sheets and firmly adherent thereto, a metal spacer strip of flexible-ductile metal arranged between the glass sheets and positioned inwardly of the peripheral edges of said sheets and also inwardly of the edges of said metallic ribbons, and solder fillets carried by the metal spacer strip on both sides thereof and along both edges thereof, said solder fillets being firmly united to the metallic ribbons on the glass sheets along both the inside and outside of each edge of the spacer strip in a manner to create a hermetically sealed space between the sheets of glass.

CHARLES D. HAVEN.
JOHN J. HOPFIELD.